United States Patent
Holt et al.

(10) Patent No.: US 8,243,754 B2
(45) Date of Patent: Aug. 14, 2012

(54) DEVICES AND METHODS FOR MATCHING LINK SPEEDS BETWEEN CONTROLLERS AND CONTROLLED DEVICES

(75) Inventors: Keith W. Holt, Wichita, KS (US);
Jeremy Stover, Wichita, KS (US);
Pamela Delaney, Wichita, KS (US);
Steven James Ralston, Wichita, KS (US)

(73) Assignee: Netapp, Inc., Sunnyvale, CA (US)

( * ) Notice: Subject to any disclaimer, the term of this patent is extended or adjusted under 35 U.S.C. 154(b) by 459 days.

(21) Appl. No.: 12/559,915

(22) Filed: Sep. 15, 2009

(65) Prior Publication Data

US 2010/0002599 A1    Jan. 7, 2010

Related U.S. Application Data

(62) Division of application No. 11/286,633, filed on Nov. 23, 2005, now Pat. No. 7,599,392.

(51) Int. Cl.
*H04J 3/16* (2006.01)

(52) U.S. Cl. .................................... 370/465; 370/232
(58) Field of Classification Search .................. 370/465, 370/252, 232, 254, 401, 402; 709/229, 208, 709/234, 233
See application file for complete search history.

(56) References Cited

U.S. PATENT DOCUMENTS

| | | | |
|---|---|---|---|
| 6,158,014 A * | 12/2000 | Henson | 713/501 |
| 6,732,201 B2 * | 5/2004 | Stover et al. | 710/60 |
| 7,366,930 B2 | 4/2008 | Gutman et al. | |

* cited by examiner

*Primary Examiner* — Brenda H Pham
(74) *Attorney, Agent, or Firm* — Haynes and Boone, LLP

(57) ABSTRACT

A controller system for detecting and matching link speeds. The present invention provides for a controller system. The controller system is a first controller and a first port. The first port is located in the first controller and has a first link speed. The first controller is adapted to match the first link speed to a second link speed of a second port of a first controlled device that is connectable to the first controller.

20 Claims, 5 Drawing Sheets

DEVICES AND METHODS FOR MATCHING LINK SPEEDS BETWEEN CONTROLLERS AND CONTROLLED DEVICES

This application is a divisional of application Ser. No. 11/286,633, filed Nov. 23, 2005, status pending.

BACKGROUND OF THE INVENTION

1. Technical Field

The present invention is directed generally towards data transfer, and in particular to a method and apparatus controlling link speed in transferring data. Still more particularly, the present invention relates to a method and apparatus for matching the link speed of a controller with the link speed of a controlled device.

2. Description of the Related Art

Storage systems, printers, adaptors, and other devices often use controllers to control the operation of the device or of multiple such devices. For example, a storage array system may contain many storage devices arranged into drive loops, with each drive loop controlled by one or more controllers inside a controller enclosure. The controller and the controlled devices communicate via communication ports, such as Fibre Channel ports, which are sometimes interconnected by devices known as hubs. One example of an input/output (I/O) interconnection system of this type is known as a Fibre Channel—arbitrated loop I/O interconnection, which is often used for modular computer systems with redundant components.

Two basic types of data communication exist between processors and between processors and peripherals, channels and networks. A channel provides a direct or switched point-to-point connection between the communicating devices. A channel is usually hardware-intensive and transports data at the high speed with low processor resource overhead. In contrast, a network is an aggregation of distributed nodes (like workstations, file servers, or peripherals) with a protocol that supports interaction among these nodes. A network has relatively high processor resource overhead because the network is software-intensive and is, consequently, slower than a channel. Networks can handle a more extensive range of tasks than channels as they operate in an environment of unanticipated connections, while channels operate amongst only a few devices with predefined addresses. Fibre Channels attempt to combine the best of these two methods of communication into an I/O interface that meets the needs of channel users and also network users.

Although it is called Fibre Channel, Fibre Channel architecture doesn't represent either a channel or a real network topology. Fibre Channel architecture allows for an active intelligent interconnection scheme, called a Fabric, to connect devices. A Fibre Channel port manages a point-to-point connection between itself and the Fabric. Thus, Fibre Channel architecture represents a high performance serial link supporting its own protocol, as well as higher level protocols. The Fibre Channel standard addresses the need for very fast transfers of large amounts of information. An advantage of Fibre Channel architecture is that it gives users one port that supports both channel and network interfaces, unburdening computers from large numbers of I/O ports. Fibre Channel architecture also provides control and complete error checking over the link.

An example of a Fibre Channel—arbitrated loop I/O interconnection system is a storage array system that includes a storage array controller enclosure, with redundant controllers, and one or more drive expansion enclosures. In this example, the controller enclosure connects to the devices in the expansion enclosures via a Fibre Channel-arbitrated loop interconnection scheme. All Fibre Channel devices attached to a given arbitrated loop are set to run at the same link speed. The term "link speed" refers to the speed at which data is transmitted over a particular link. Each individual enclosure can support more than one Fibre Channel link speed, so the enclosures attached to a given loop are somehow configured to operate at the same link speed. However, in some types of systems, the controller enclosure can allow the drive loops to be operated at different link speeds.

An existing approach for matching link speeds between controllers and controlled devices is to set mechanical switches on the exterior of the controller enclosure and/or the enclosures of the controlled devices. Published Fibre Channel standards also specify a link speed negotiation process that can be used to automatically configure the link speed for point-to-point topologies. Fibre Channel standards may be found at fibrechannel.org.

However, these existing approaches for matching link speeds are not optimal. Mechanical switches increase the cost and manufacturing complexity of the controller and/or the controlled devices. Further, mechanical switches are also relatively prone to failure compared to solid state systems. In addition, a human operator physically sets the link speeds—a process that can be time consuming, tedious, and expensive. On the other hand, Fibre Channel link speed negotiation is not a practical solution for loop topologies. The speed negotiation algorithm defines a method to allow two ports to negotiate a common speed for physical architectures where the transmitter of each port involved in the negotiation is connected to the receiver of the other port involved in the negotiation. In loop topologies, the transmitter and receiver in a given device can be connected to two different devices.

SUMMARY OF THE INVENTION

The present invention provides for a controller system. The controller system is a first controller and a first port. The first port is located in the first controller and has a first link speed. The first controller is adapted to match the first link speed to a second link speed of a second port of a first controlled device that is connectable to the first controller. In addition, the first controller is configured for connection to the first controlled device via a hub.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
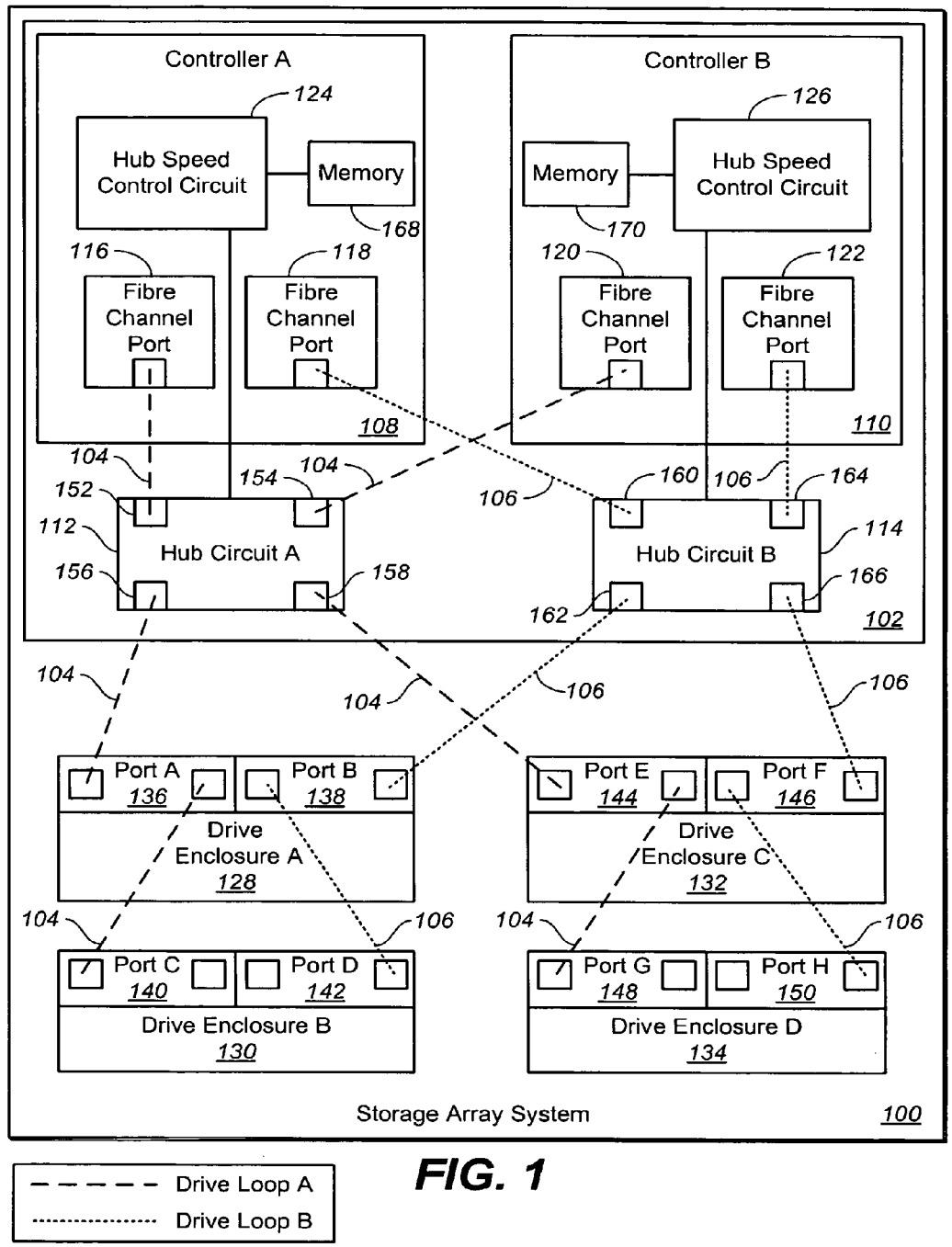
FIG. 1 is a block diagram of a storage system, in accordance with an illustrative example of the present invention.

FIG. 1 is a block diagram of a storage system, in accordance with an illustrative example of the present invention. In this example, the storage system takes the form of redundant storage array system 100. Although redundant storage array system 100 is presented a system of controllers and storage drives, redundant storage array system 100 can be any system of controllers and controlled devices. For example, drive loop A 104, shown by the dashed lines, and drive loop B 106, shown by the dotted lines, could be any group of devices connected in a loop topology. In the illustrative examples described herein, the controlled devices communicate at a fixed link speed. The term "link speed" refers to the speed at which data is transmitted over a particular link. A "fixed link speed" device has a link speed that does not change or is changed with physical switches; in other words, a fixed link speed device normally does not change link speeds while in operation. The devices may inherently operate at a fixed link speed, or they may be constrained to operate at a fixed link speed because they are part of a loop topology. Examples of fixed link speed devices can include disk drives, host adaptors, printers, tape drives, and a host of other devices. Even though host adaptors typically support link speed negotiation, host adaptors operate a fixed links peed in a loop topology.

In addition, although controller A 124 and controller B 126 use Fibre Channel ports, the mechanism of the present invention can function with other types of communication ports so long as communication ports among controller enclosure 102, drive loop A 104, and drive loop B 106 are to maintain the same link speed or operate in a loop topology. In addition, link speed detection using the mechanism of the present invention is not subject to the timing requirements specified for link speed negotiation.

In addition, although FIG. 1 shows the use of two controllers and two hubs within controller enclosure 102 and shows the use of two drive loops, each connected to four drive enclosures, more or fewer controllers, hubs, and drive loops may be used with the link speed detection and setting algorithm described below. Similarly, more or fewer drive enclosures may be connected to each drive loop. Thus, the mechanism of the present invention may be adapted for many different types and configurations of controllers, hubs, drive loops, drive enclosures, and types of controlled devices.

In addition, the various components of controller enclosure 102 may be physically implemented using a number of methods. For example, hub circuit A 112 and hub circuit B 114 within controller enclosure 102 can be integrated into a controller printed circuit board. However, hub circuit A 112 and hub circuit B 114 can be integrated into a stand-alone printed circuit board. The other components shown in FIG. 1 can be physically implemented using known techniques.

In the illustrative example shown in FIG. 1, redundant storage array system 100 includes controller enclosure 102, which is connected to drive loop A 104 and to drive loop B 106. An enclosure represents a physical system contained within in a single physical container. A loop connects four or more enclosures of similar systems so that the enclosures operate as a unit. Controller enclosure 102 includes controller A 108, controller B 110, hub circuit A 112, and hub circuit B 114. Controller A 108 and controller B 110 serve as controllers for drive loop A 104 and drive loop B 106, which both include a number of storage drive devices in drive loops, as described below. Hub circuit A 112 and hub circuit B 114 are hubs that coordinate the connections between controller A 108, controller B 110, drive loop A 104, and drive loop B 106.

Controller A 108 also has hub speed control circuit 124, which determines the link speed of controller A 108. Hub speed control circuit 124 is an example of a control system for controlling the link speed of controller A 108; however, a control system may also be implemented using software. In addition, controller A 108 includes Fibre Channel port 116 and Fibre Channel port 118. As defined above, the link speed is the speed at which data flows through a port, such as Fibre Channel port 116 and Fibre Channel port 118. Controller A also controls the link speed of hub circuit A. Controller A also has additional circuitry and/or software for controlling drive loops, such as drive loop A 104 and drive loop B 106. In a manner similar to controller A 108, controller B 110 includes hub speed control circuit 126, which determines the link speed of controller B 110. Hub speed control circuit 126 is an example of a control system for controlling the link speed of controller B 110; however, a control system may also be implemented using software. In addition, controller B 110 includes Fibre Channel port 120 and Fibre Channel port 122.

As mentioned above, drive loop A 104 and drive loop B 106 includes a number of storage drive enclosures. In the illustrative example of FIG. 1, drive loop A 104 includes drive enclosure A 128, drive enclosure B 130, drive enclosure C 132 and drive enclosure D 134. Similarly, drive loop B 106 includes drive enclosure A 128, drive enclosure B 130, drive enclosure C 132 and drive enclosure D 134. Each drive enclosure, 128, 130, 132, and 134 includes a storage drive system suitable for storing data. To communicate with controller A 108 and controller B 110, each drive enclosure has a number of communication ports, which may also be Fibre Channel ports. Specifically, drive enclosure A 128 includes port A 136 and port B 138. Drive enclosure B includes port C 140 and port D 142. Drive enclosure C includes port E 144 and port F 146. Drive enclosure D 134 includes port G 148 and port H 150.

In the illustrative example shown, drive loop A 104 is formed from the connections of ports to hub circuit A 112, and the daisy-chain connection from port A 136 to port C 140. Drive loop B 106 is formed from the connections to hub circuit B 114, and the daisy-chain connection from port F 146 to port H 150. The two drive loops form a redundant loop pair. Each drive in each drive enclosure can be accessed on either drive loop A or B. Thus, each of the components shown is connected to other components in a particular manner, as shown by the lines connecting each component. Specifically, hub speed control circuit 124, Fibre Channel port 116, and Fibre Channel port 120 connect to hub circuit A 112. Hub speed control circuit 126, Fibre Channel port 122, and Fibre Channel port 118 connect to hub circuit B 114. In turn, hub circuit A 112 connects to port A 136 of drive enclosure A 128 and to port E 144 of drive enclosure C 132. Similarly, hub circuit B 114 connects to port B 138 of drive enclosure A 128 and to port F 146 of drive enclosure C 132. In turn, port A 136 of drive enclosure A 128 connects to port C 140 of drive enclosure B 130 and port B 138 of drive enclosure A 128 connects to port D 142 of drive enclosure B 130. Similarly, port E 144 of drive enclosure C 132 connects to port G 148 of drive enclosure D 134 and port F 146 of drive enclosure C 132 connects to port H 150 of drive enclosure D 134.

Because drive enclosure A 128, drive enclosure B 130, drive enclosure C 132, and drive enclosure D 134 are connected in the manner shown, the drive enclosures form drive loop A 104 and drive loop B 106. For this reason, drive enclosure A 128, drive enclosure B 130, drive enclosure C 132, and drive enclosure D 134 can all be accessed using drive loop A 104 and drive loop B 104. Accordingly, both controller A 108 and controller B 110 can control all four drive enclosures 128, 130, 132, and 134.

In addition, as mentioned above, hub circuit A 112 and hub circuit B 114 coordinate communication between controller A 108, controller B 110, drive loop A 104, and drive lop B 106. Each hub circuit has all hardware and/or software necessary to coordinate communication of data between each of these components and between the sub-components present in each component.

Continuing with the illustrative example shown in FIG. 1, drive loop A 104 and drive loop B 106 provide two expansion ports, port A 136 and port B 138 for drive enclosure A 128 and port E 144 and port F 146 for drive enclosure C 132. One Fibre Channel interface port on each controller is attached to each drive loop via a hub circuit integrated into the controller enclosure, as described above. Controller A 108 and controller B 110 configure hub circuit A 112 and hub circuit B 114 via out-of-band methods using an algorithm described in detail with respect to FIG. 2 through FIG. 6. The link speeds of drive enclosure A 128, drive enclosure B 130, drive enclosure C 132, and drive enclosure D 134 are set to a fixed link speed.

Link speed detection is performed independently for each of drive loop A 104 and drive loop B 106. One of controller A 108 and controller B 110 is designated as the master for each hub circuit. The other controller is referred to as the slave controller. In the illustrative example of FIG. 1, controller A 108 is the master controller and controller B 110 is the slave controller. The general procedure for performing link speed detection for each drive loop is described below and is further described vis-à-vis FIG. 2 through FIG. 6. In the following example, ports 152 and 154 in hub circuit A 112 and ports 160 and 164 in hub circuit B 114 are internal ports. In addition, ports 156 and 158 in hub circuit A 112 are expansion ports and ports 162 and 166 in hub circuit B 114 are expansion ports.

Using drive loop A as an example, the link speed setting and detection algorithm begins as the master controller, controller A 108, sets the link speed of the hub circuit A 112 and its Fibre Channel interface port connected to hub circuit A, Fibre Channel port 116. The set link speed is a link speed supported by master controller A 108. Next, master controller A 108 checks the link speed of the hub expansion ports in both hub circuit A. Expansion ports include ports, 156, and 158 in hub circuit A 112. An expansion port is bypassed if the set link speed does not equal the link speed in the expansion ports of a given hub circuit. If hub circuit A 112 has at least one expansion port that is not bypassed, then link speed selection is successfully completed for drive loop A. The link speed of Fibre Channel ports 120 and 122 in slave controller B 110 is then set to the set link speed of master controller A 108. Any time one of Fibre Channel interface ports 120 and 122 on slave controller B 1110 is bypassed, slave controller B 110 cycles through all supported link speeds for that Fibre Channel port until that Fibre Channel port is no longer bypassed. In any case, if all expansion ports of the hub circuit are bypassed, then master controller A 108 selects a new supported link speed to form a second set link speed. The process described above then repeats.

If all link speeds supported by master controller A 108 are tried unsuccessfully, then master controller A 108 can elect to periodically retry the above-described procedure to test if any supported devices have been attached to controller enclosure 102. Optionally, master controller A 108 can monitor for the negation of the "loss of receiver" signal that indicates that a drive enclosure is attached to an expansion port. Put differently, master controller A 108 can monitor a receive loss of receiver signal (Rx_LOS) indication for each expansion port. The loss of receiver signal is true if no signal is detected at the receiver. If the loss of receiver signal changes from true to false on one of the expansion ports, then master controller A 108 restarts the link speed detection process described above.

Optionally, master controller A 108 can store the current set link speed into a non-volatile memory, such as memory 168 in controller A 108 or memory 170 in controller B 110. Both memory 168 and memory 170 can be combined into a single memory within controller enclosure 102. In any case, the stored set link speed can be used as a starting point for link speed detection following a power cycle of controller enclosure 102. The stored set link speed ensures that if a new drive enclosure set to a different link speed is attached to an open expansion port, the link speed selection algorithm described above will match the speed of a previously attached drive enclosure connected to a different expansion port. In addition, allowing controller B 110 to be the master for drive loop B 106 ensures that each controller would have access to at least one drive loop if the alternate controller failed. Thus, slave controller B 110 can take over control of the controlled devices if master controller A 108 failed.

From the preceding description of FIG. 1, the present invention allows a modular controller enclosure with redundant controllers to automatically match the link speed of Fibre Channel ports and hub circuits within the enclosure to the link speed of drive expansion enclosures connected to the controller enclosure via one or more arbitrated loops. In the example shown in FIG. 1, the controller system is a first controller and a first port. The first port is located in the first controller and has a first link speed. The first controller is adapted to match the first link speed to a second link speed of a second port of a first controlled device that is connectable to the first controller. In addition, the first controller is configured for connection to the first controlled device via a hub.

As described with respect to FIG. 1, a system with redundant controllers uses a hub circuit. However, the mechanism of the present invention could also be used in single controller system, which would not require the use of a hub circuit. In this case, the Fibre Channel ports such as 116 and 118 would directly serve as the expansion ports.

Figure 2:
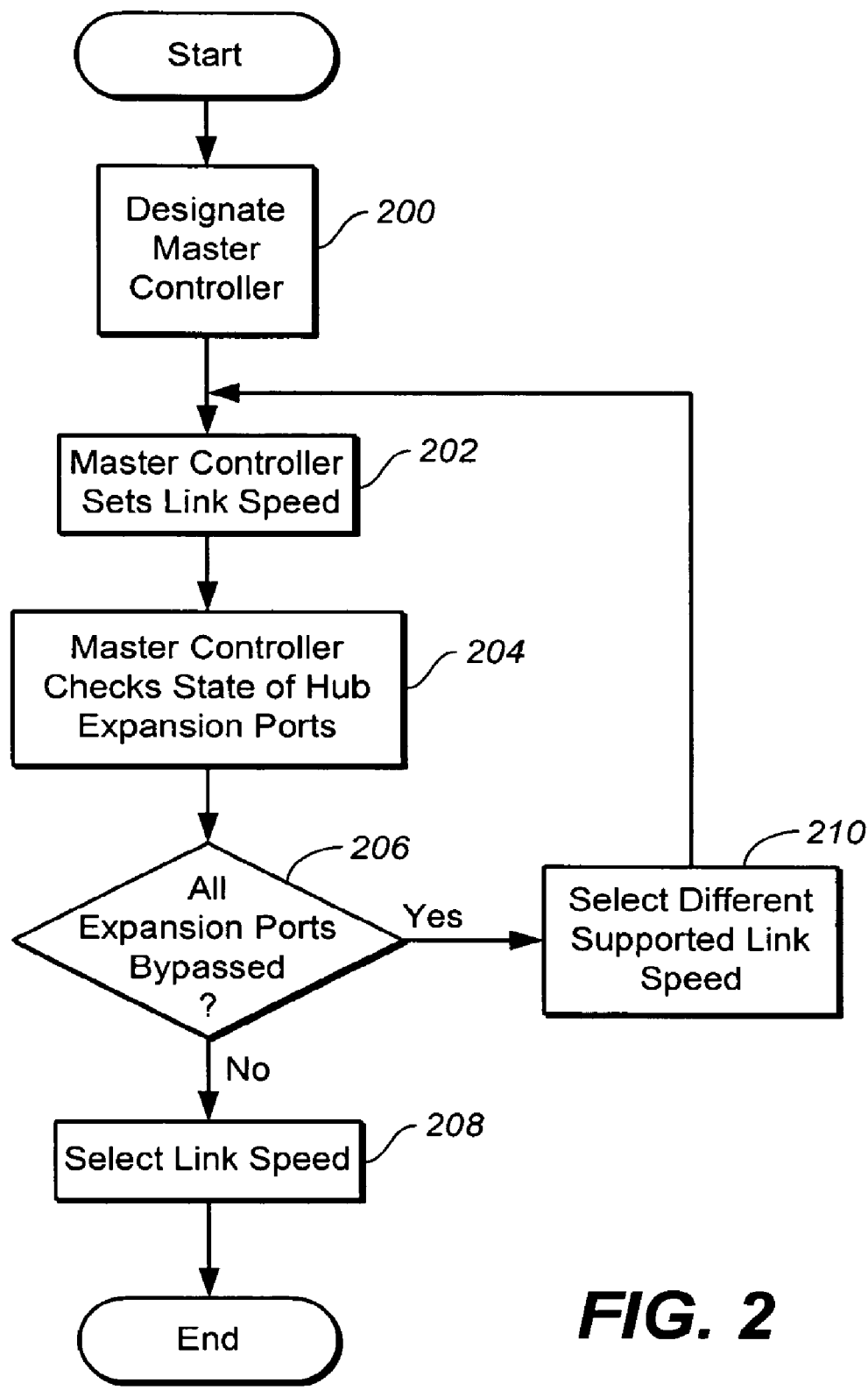
FIG. 2 is a flowchart illustrating a process of matching of link speeds between a controller and a controlled device, in accordance with an illustrative example of the present invention.

FIG. 2 is a flowchart illustrating a process of matching of link speeds between a controller and a controlled device, in accordance with an illustrative example of the present invention. The method described in FIG. 2 may be implemented in redundant storage array system 100 in FIG. 1, or may be implemented in any similar controller-controlled device system where the link speed of the controlled device or controlled devices are fixed.

Initially, a user or the manufacturer designates which of multiple controllers within a controller enclosure is the master controller (step 200). The master controller then sets a set link speed from the available supported link speeds (step 202). The master controller then checks the state of hub expansion ports for the link speeds present in the hub expansion ports (step 204). An expansion port is bypassed if the set link speed does not equal the link speed in an expansion port. A determination is then made whether all expansion ports have been bypassed (step 206). If all expansion ports have been bypassed, then the master controller sets a different supported link speed as a second set link speed (step 210). The process then repeats between steps 202 and 204. If all expansion ports have not been bypassed, then the set link speed is the selected link speed (step 208). The process terminates thereafter.

Figure 3:
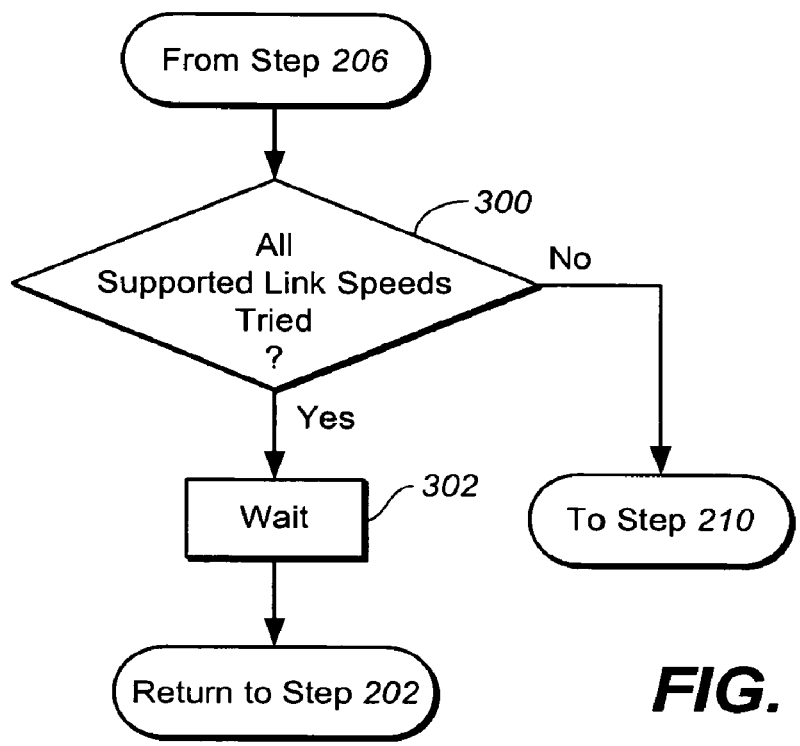
FIG. 3 is a flowchart illustrating optional steps for the process shown in FIG. 2, in accordance with an illustrative example of the present invention.

FIG. 3 is a flowchart illustrating optional steps for the process shown in FIG. 2, in accordance with an illustrative example of the present invention. The method described in FIG. 3 may be implemented in redundant storage array system 100 in FIG. 1, or may be implemented in any similar controller-controlled device system where the link speed of the controlled device or controlled devices are fixed.

From step 206 in FIG. 2, a determination is made whether all link speeds supported by the master controller have been tried (step 300). If not all supported link speeds have been tried, then the process continues to step 210 in FIG. 2. Otherwise, the master controller waits a period of time determined by the manufacturer or by a user (step 302). The process then returns to step 202 in FIG. 2.

Figure 4:
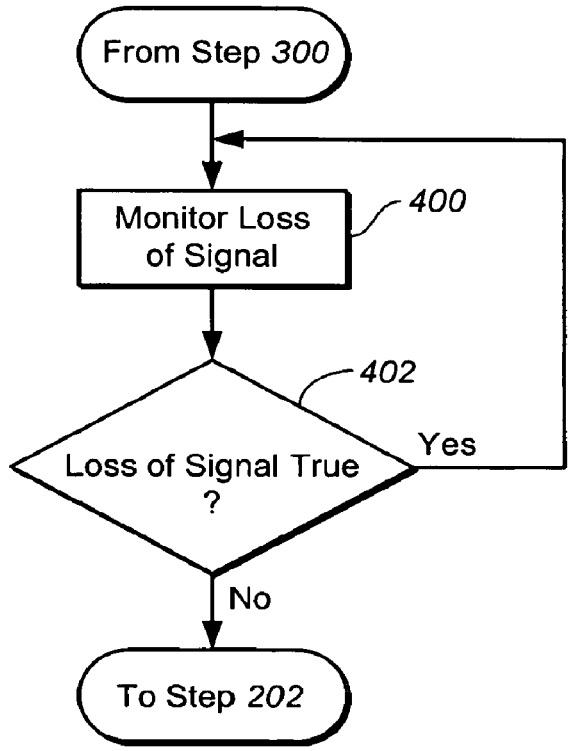
FIG. 4 is a flowchart illustrating optional steps for the process shown in FIG. 3, in accordance with an illustrative example of the present invention.

FIG. 4 is a flowchart illustrating optional steps for the process shown in FIG. 3, in accordance with an illustrative example of the present invention. The method described in FIG. 4 may be implemented in redundant storage array system 100 in FIG. 1, or may be implemented in any similar controller-controlled device system where the link speed of the controlled device or controlled devices are fixed.

From step 300 in FIG. 3, the master controller monitors for a loss of a signal indicating that a controlled device is attached to the master controller (step 400). A determination is then made whether the loss of signal is true (step 402). A loss of signal is true if no signal is detected at the receiver of the expansion ports. If the loss of signal is true, then the process returns to step 400, meaning that the master controller continues to wait at step 302 of FIG. 3. If the loss of signal is false, that is the master controller detects a signal at the receiver of an expansion port, then the process returns to step 202 in FIG. 2, meaning that the link speed determination and setting algorithm is repeated.

Figure 5:
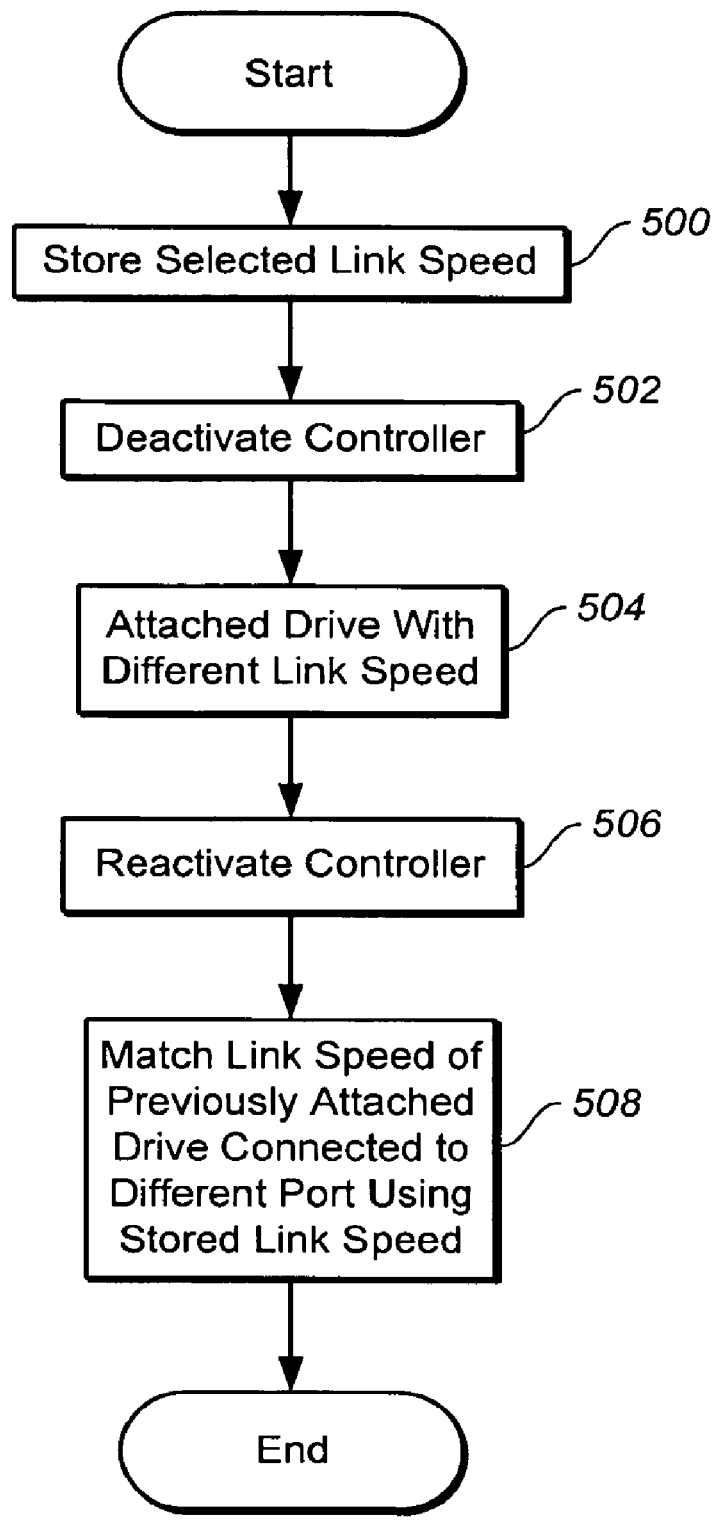
FIG. 5 is a flowchart illustrating a process of using a stored link speed as a starting point for link speed diction following a power cycle of a controller, in accordance with an illustrative example of the present invention.

FIG. 5 is a flowchart illustrating a process of using a stored link speed as a starting point for link speed diction following a power cycle of a controller, in accordance with an illustrative example of the present invention. The method described in FIG. 5 may be implemented in redundant storage array system 100 in FIG. 1, or may be implemented in any similar controller-controlled device system where the link speed of the controlled device or controlled devices are fixed. The process shown in FIG. 5 takes place after the process in FIG. 2 has completed.

Initially, the set link speed is stored in a non-volatile memory (step 500). Thereafter, the master controller is deactivated (step 502). A master controller can be deactivated by cutting off power to the master controller, turning off the master controller, pausing the master controller, or by disconnecting all controlled devices from the master controller. While the master controller is deactivated, a drive enclosure is attached to the master controller, the drive enclosure having a different link speed than the set link speed (step 504). The master controller is then reactivated (step 506). Finally, the master controller matches the link speed of the new drive enclosure that is connected to a different port using the stored link speed (step 508). The process terminates thereafter.

Figure 6:
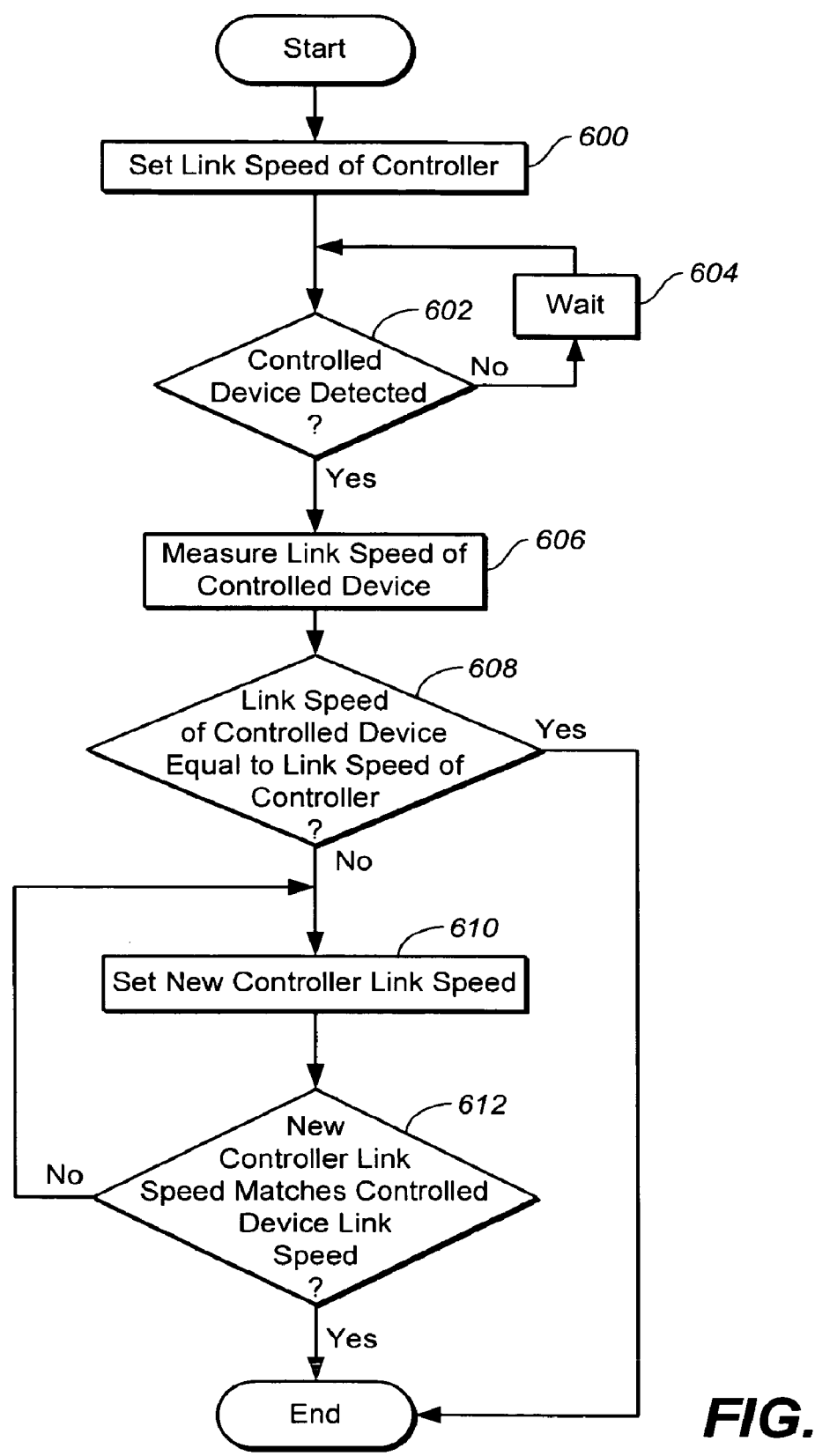
FIG. 6 is a flowchart illustrating a process of matching of link speeds between a controller and a controlled device, in accordance with an illustrative example of the present invention.

FIG. 6 is a flowchart illustrating a process of matching of link speeds between a controller and a controlled device, in accordance with an illustrative example of the present invention. The method described in FIG. 6 may be implemented in redundant storage array system 100 in FIG. 1, or may be implemented in any similar controller-controlled device system where the link speed of the controlled device or controlled devices are fixed. The method shown in FIG. 6 represents a different description of the method presented in FIG. 2 and incorporates some of the steps in FIG. 3 through FIG. 5.

Initially, the master controller sets a set link speed of the master controller (step 600). The master controller then determines whether a controlled device is detected (step 602). If no controlled device is detected, then the master controller waits for a period of time set by the manufacturer or by a user (step 604). The process then returns to step 602.

If a controlled device is detected, then the master controller measures the link speed of the controlled device (step 606). The master controller then determines whether the link speed of the controlled device is equal to the set link speed of the master controller (step 608). If the link speed of the controlled device is equal to the set link speed of the master controller, then the process terminates. However, if the link speed of the controlled device is not equal to the set link speed of the master controller, then the master controller sets a new link speed (step 610). The master controller then determines whether the new set link speed of the master controller matches the link speed of the controlled device (step 612). If a match does not exist, then the process returns to step 610 so that the master controller can try to match yet another new set link speed. The process thereby continues iteratively between steps 610 and 612 until eventually a set link speed supported by the master controller matches the link speed of the controlled device. If the no supported set link speed exists, then the iterative loop may terminate, or the iterative loop may continue. However, once a new set link speed of the master controller matches the controlled device link speed, then the process terminates.

The algorithm and mechanism of the present invention for matching the link speed of a controller to the link speed of a controlled device has several advantages over known methods of controlling controlled devices. For example, the controller of the present invention is less expensive and easier to manufacture because mechanical switches and associated wiring is eliminated. Furthermore, because no mechanical switches or associated wiring is needed, the controller is more reliable than known controllers. In addition, a customer need not manually configure a controller enclosure using switches during installation of the controller with one or more controlled devices. Furthermore, serviceability is increased because no need exists to record and duplicate switch settings when a failed controller or controller enclosure is replaced.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A storage system comprising:
    a first controller having a first port, the first port having a first link speed;
    a second controller having a second port, the second port having a second link speed;
    a first storage device having a third port, the third port having a third link speed and the third port connected to the first port and to the second port via a first hub; and
    a control system associated with the first controller, wherein the control system is configured to match the first link speed to the third link speed.

2. The storage system of claim 1 wherein the control system is further configured to match the second link speed to the first link speed.

3. The storage system of claim 1 wherein the control system is one of a circuit and a computer usable program code, the computer usable program code comprising a computer usable medium having instructions for matching causing the second link speed and the third link speed to match the first link speed.

4. The storage system of claim 1 wherein the first port and the second port are Fibre Channel ports.

5. The storage system of claim 1 further comprising:
a second storage device having a fourth port, the fourth port having a fourth link speed and the fourth port connected to the first port and to the second port via a second hub.

6. The storage system of claim 5 wherein the first storage device comprises a first storage sub-device and a second storage sub-device connected to the first storage sub-device.

7. The storage system of claim 6 wherein the second storage device comprises a third storage sub-device and a fourth storage sub-device connected to the third storage sub-device.

8. The storage system of claim 5 wherein the first hub is connected to the first port and to a fifth port, the fifth port part of the second controller, wherein the first hub is also connected to the first storage device and the second storage device, and wherein the second hub is connected to the second port and to a sixth port, the sixth port part of the first controller, wherein the second hub is also connected to the first storage device and the second storage device.

9. The storage system of claim 7 wherein the first storage sub-device and the second storage sub-device compose a first drive loop and wherein the third storage sub-device and the fourth storage sub-device compose a second drive loop.

10. The storage system of claim 1 in which the control system compares the first link speed to the third link speed and, responsive to discerning that the first and third link speeds are unequal, iteratively setting additional link speeds at the first port and comparing those additional link speeds until a link speed of the first port matches the third link speed.

11. A storage system comprising:
a first controller with a first port; and
a first storage device with a second port, the first storage device in communication with the first controller; in which the first port has a first link speed, in which the first controller is configured to match the first link speed to a second link speed of the second port, and in which the first controller is configured for connection to the first storage device via a hub.

12. The storage system of claim 11 in which the storage device comprises a storage drive.

13. The storage system of claim 11 further comprising: a second controller having a third port, the third port having a third link speed, wherein the first controller is further configured to match the third link speed to the first link speed.

14. The storage system of claim 13 wherein a second storage device is connectable to the second controller and the first controller, the second storage device having a fourth link speed, and in which the first controller is configured to match the fourth link speed to the first link speed.

15. The storage system of claim 11 in which the first controller compares the first link speed to the second link speed and, responsive to discerning that the first and second link speeds are unequal, iteratively setting additional link speeds at the first port and comparing those additional link speeds until a link speed of the first port matches the second link speed.

16. The storage system of claim 11 in which the first and second ports comprise Fibre Channel ports.

17. An electronic system comprising:
a first controller with a first port and a first link speed;
a first controlled device with a second port and a second link speed, the first controlled device being in communication with the first controller; and
a hub coordinating communication between the first controller and the first controlled device, further in which the first controller includes a control system to match the first link speed to the second speed.

18. The electronic system of claim 17 in which the control system compares the first link speed to the second link speed and, responsive to discerning that the first and second link speeds are unequal, iteratively setting additional link speeds at the first port and comparing those additional link speeds until a link speed of the first port matches the second link speed.

19. The electronic system of claim 17 further comprising:
a second controller with a third port and a third link speed;
a second controlled device with a fourth port and a fourth link speed; in which the second controller and the second controlled device are in communication with the first controller via the hub, further in which the second controller is in communication with the second controlled device via another hub, in which the first controller matches the third link speed to the first link speed.

20. The electronic system of claim 19 in which the first hub is in a first drive loop, and which the another hub is in a second drive loop.

* * * * *